(12) United States Patent
Weber et al.

(10) Patent No.: US 9,818,016 B2
(45) Date of Patent: Nov. 14, 2017

(54) METHOD AND FINGERPRINT SENSING SYSTEM FOR FORMING A FINGERPRINT REPRESENTATION

(71) Applicant: FINGERPRINT CARDS AB, Göteborg (SE)

(72) Inventors: Sebastian Weber, Malmö (SE); Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/158,749

(22) Filed: May 19, 2016

(65) Prior Publication Data
US 2016/0350574 A1     Dec. 1, 2016

(30) Foreign Application Priority Data
May 28, 2015   (SE) ..................................... 1550689

(51) Int. Cl.
*G06K 9/00*     (2006.01)

(52) U.S. Cl.
CPC ................................ *G06K 9/00026* (2013.01)

(58) Field of Classification Search
None
See application file for complete search history.

(56) References Cited

U.S. PATENT DOCUMENTS

| 2005/0259852 | A1  | 11/2005 | Russo |
| 2006/0023921 | A1* | 2/2006  | Saitoh .................. G06K 9/3275 382/115 |
| 2007/0274575 | A1  | 11/2007 | Russo |
| 2008/0205714 | A1* | 8/2008  | Benkley ............... G06F 3/03547 382/126 |
| 2012/0016798 | A1* | 1/2012  | Carper ................ G06Q 20/1085 705/43 |
| 2014/0003678 | A1* | 1/2014  | Vieta .................. G06K 9/00026 382/124 |

* cited by examiner

*Primary Examiner* — Sumati Lefkowitz
*Assistant Examiner* — David Perlman
(74) *Attorney, Agent, or Firm* — RMCK Law Group PLC

(57) ABSTRACT

The present invention generally relates to a method for forming a fingerprint using a fingerprint sensing system, and specifically to the possibility of allowing the formation of a fingerprint when only separated portions of the fingerprint is available. The invention also relates to the corresponding fingerprint sensing system and to a computer program product.

18 Claims, 3 Drawing Sheets

METHOD AND FINGERPRINT SENSING SYSTEM FOR FORMING A FINGERPRINT REPRESENTATION

CROSS REFERENCE TO RELATED APPLICATIONS

This application claims the benefit of Swedish Patent Application No. 1550689-2 filed May 28, 2015. The disclosure of the above application is incorporated herein by reference in its entirety.

TECHNICAL FIELD

The present invention generally relates to a method for forming a fingerprint using a fingerprint sensing system, and specifically to the possibility of allowing the formation of a fingerprint when only separated portions of the fingerprint is available. The invention also relates to the corresponding fingerprint sensing system and to a computer program product.

BACKGROUND OF THE INVENTION

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between several sensing elements and a finger placed on the surface of the fingerprint sensor. Acquisition of a partial fingerprint image may be performed using a fingerprint sensor comprising a plurality of sensing elements arranged in a two-dimensional manner, where this fingerprint sensor is configured to in a single image capture the majority of a person's complete fingerprint.

As an alternative, a line sensor may be used for acquiring a fingerprint image, sometimes also referred to as a swipe sensor. The line sensor is typically a thin, rectangular shaped device configured to obtain a plurality of small overlapping images, or snapshots, as a finger is swiped past the sensor. A complete fingerprint image is obtaining by processing these snapshots to form a composite image. The compiling of the smaller images into a complete fingerprint is typically referred to as "stitching" the images.

Successful stitching for forming the complete fingerprint requires extensive computing resources and the collection of a large plurality of overlapping images. Powerful microprocessors, significant amounts of memory, and a relatively long processing time are required to adequately process the fingerprints.

An exemplary implementation trying to improve this fallback is disclosed in US 2007/0274575. Specifically, US 2007/0274575 discloses a method and system for reconstructing seamless fingerprint image from set of image slices, or frames, from a fingerprint swipe sensor. According to US 2007/0274575, minutiae extraction may be performed separately over a sub-portion rather than over the full or complete fingerprint.

Even though US 2007/0274575 introduces an interesting approach to fingerprint feature extraction from portions of a complete fingerprint, the disclosed approach is highly dependent on the overlap of image slices acquired using the fingerprint sensor, resulting in a less than robust system. Thus, there appears to be room for further improvement in regards to efficient and robust processing of fingerprints, specifically in relation to fingerprints collected when a user swipes his/her finger over the fingerprint sensor.

SUMMARY OF THE INVENTION

In view of above-mentioned and other drawbacks of the prior art, it is an object of the present invention to provide an improved method for forming a fingerprint using a fingerprint sensing system. In particular, the present inventors have found that it would be desirable to determine a relation between separate image portions collected using a fingerprint sensor for improving the robustness and efficiency of the fingerprint sensing system in cases where only separated portions of the fingerprint are made available.

According to an aspect of the present invention, it is therefore provided a method of forming a fingerprint representation of a fingerprint pattern of a finger captured using a fingerprint sensor, the method comprising the steps of acquiring a first partial image of a corresponding first portion of a fingerprint pattern using the fingerprint sensor, extracting a first fingerprint feature from the first partial image, acquiring a second partial image of a corresponding second portion of the fingerprint pattern using the fingerprint sensor, the second partial image being non-overlapping with the first partial image, extracting a second fingerprint feature from the second partial image, determining a first parameter for each of the first and the second fingerprint feature, the first parameter being at least one of a representation of a relative spatial fingerprint position for the respective fingerprint feature and a representation of a relation of the fingerprint feature to the finger, and forming the fingerprint representation by correlating the first parameter for the first fingerprint feature with the first parameter for the second fingerprint feature.

The present invention is based upon the realization that it in some instances may be desirable to place less constrains during the formation of a fingerprint representation, such as during an enrollment process. Specifically, in some instances non-overlapping image portions will be acquired when operating the fingerprint sensor, for example due to swiping the finger over the sensor at the "wrong speed", some errors in image acquisition, etc. In such a scenario it may still be so that the information being collected may be used rather than discarding the full fingerprint acquisition and starting over again (as is the normal prior art approach). However, to be able to make use of the acquired information it is necessary to determine some form of information as to a relation between each of the acquired partial images of the finger. It should be understood that the disclosed concept is applicable also in situation where e.g. a non-overlapping partial image is correlated with plurality of mutually e.g. partly overlapping partial images (i.e. at least one image is non-overlapping is with the rest of the acquired imaged).

In one embodiment, the mentioned relative spatial fingerprint position for each of the partial images may be estimated by determining at least one of a speed of the finger being swiped over the sensor or by determining a duration between the acquisition of the different partial images. In another embodiment it may also be possible to correlate a specific fingerprint feature for a partial fingerprint image with information (features) from a previously formed fingerprint representation. As such, it may for example be possible to determine an "absolute" position of one of the first and the second fingerprint features and thereby determine a relation for the other one of the first and the second fingerprint features. If only one of the first and the second fingerprint features are included with the previously formed fingerprint representation, it may be possible to append the fingerprint representation with the "non available" fingerprint feature. Accordingly, it may be possible to build a complete fingerprint representation "over time".

As mentioned above, the first parameter may also be a representation of a relation of the fingerprint feature to the finger itself, typically to the same finger of a (single user). As such, the features may not necessarily need to be directly spatially related with each other, but instead connected to the specific finger of the single user. This will accordingly allow for "connecting" a plurality of fingerprint features to a specific finger, without necessarily having to rely on their interrelated spatial relation to each other.

In an embodiment, an electronic device provided with the fingerprint sensing system could be arranged in an "enrolment mode", where a user is requested to use the fingerprint sensor, such that at least a couple of fingerprint features may be determined (e.g. including their spatial relation). Subsequently, every time the user would touch/swipe/contact the fingerprint sensor, for example during normal non-fingerprint sensing related use of the electronic device; the previously determined fingerprint representation could be appended with further fingerprint features. Typically, the previously determined fingerprint representation is only appended in situations where the electronic device is certain (above a predetermined threshold of reliability) that the electronic device is operated by the correct user.

The present invention is also useful in situations where there sampling interrupts are happening, for example where the fingerprint sensing system is comprised with an electronic device and the fingerprint sensing system is controlled by a main control processor. The main control process may for example request for the acquisition of a plurality of partial fingerprint images, but could then potentially go into an interruption mode where the main processor is not able to fully handle all of the received fingerprint images (for example due to another task having a higher priority for execution).

Instead of discarding the data, i.e. the plurality of partial fingerprint images that where in fact collected, the data could still be used but with the necessity to determine some form of relation between each of the received partial fingerprint images. In such a case it could for example be possible to "number" each of the partial fingerprint images during their acquisition, i.e. from 1-N, and have knowledge of the time difference between sampling of each of the partial fingerprint images. As such, it may for example be possible to determine an estimation of a relation between for each of the partial fingerprint images and accordingly for each of the determined fingerprint features.

Thus, it may in accordance to the invention be possible to improve the efficiency of the fingerprint sensing system in cases where only separated portions of the fingerprint are available. It should be understood that it may be possible, and within the scope of the invention to combine the speed/duration between acquired partial images with the concept of making use of correlation with a previously determined fingerprint representation.

According to another aspect of the present invention, there is provided a fingerprint sensing system, comprising a fingerprint sensor, a memory, and processing circuitry for forming a fingerprint representation of a fingerprint pattern of a finger captured when swiped over the fingerprint sensor, the processing circuitry connected to the fingerprint sensor and further configured for acquiring a first partial image of a corresponding first portion of a fingerprint pattern using the fingerprint sensor, extracting a first fingerprint feature from the first partial image, acquiring a second partial image of a corresponding second portion of the fingerprint pattern using the fingerprint sensor, the second partial image being non-overlapping with the first partial image, extracting a second fingerprint feature from the second partial image, determining a first parameter for each of the first and the second fingerprint feature, the first parameter being at least one of a representation of a relative spatial fingerprint position for the respective fingerprint feature and a representation of a relation of the fingerprint feature to the finger, and forming the fingerprint representation by correlating the first parameter for the first fingerprint feature with the first parameter for the second fingerprint feature. This aspect of the invention provides similar advantages as discussed above in relation to the previous aspect of the invention.

The fingerprint sensor may, as indicated above, be implemented using any kind of currently or future fingerprint sensing principles, including for example capacitive, optical, or thermal sensing technology. However, at present capacitive sensing is most preferred. Both one and two-dimensional sensors are possible and within the scope of the invention.

The fingerprint sensing system preferably forms part of an electronic device further comprising a device controller for providing said authentication request for said finger to the fingerprint sensing system, receiving said authentication signal from the fingerprint sensing system, and performing at least one action only if said authentication signal indicates authentication success. Such an action may for example be for unlocking a locked portable device, e.g. in case the portable device is a mobile phone. The at least one action may of course be any type of action suitably used when there is a need to authenticate a finger.

According to a further aspect of the present invention, there is provided a computer program product comprising a computer readable medium having stored thereon computer program means for controlling a portable electronic device, the portable electronic device comprising a fingerprint sensing system including a fingerprint sensor and processing circuitry, the fingerprint sensing system adapted for forming a fingerprint representation of a fingerprint pattern of a finger captured when swiped over the fingerprint sensor, wherein the computer program product comprises code for acquiring a first partial image of a corresponding first portion of a fingerprint pattern using the fingerprint sensor, code for extracting a first fingerprint feature from the first partial image, code for acquiring a second partial image of a corresponding second portion of the fingerprint pattern using the fingerprint sensor, the second partial image being non-overlapping with the first partial image, code for extracting a second fingerprint feature from the second partial image, code for determining a first parameter for each of the first and the second fingerprint feature, the first parameter being at least one of a representation of a relative spatial fingerprint position for the respective fingerprint feature and a representation of a relation of the fingerprint feature to the finger, and code for forming the fingerprint representation by correlating the first parameter for the first fingerprint feature with the first parameter for the second fingerprint feature. Also this aspect of the invention provides similar advantages as discussed above in relation to the previous aspects of the invention.

The processing circuitry preferably includes an ASIC, a micro processor or any other type of computing device. Similarly, a software executed by the processing circuitry for operating the inventive functionality may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

In summary, present invention generally relates to a method for forming a fingerprint using a fingerprint sensing system, and specifically to the possibility of allowing the formation of a fingerprint when only separated portions of the fingerprint is available. The invention also relates to a corresponding electronic device and to a computer program product.

Specifically, non-overlapping image portions are acquired by a fingerprint sensor. A fingerprint feature is extracted for each of the image portions. For each fingerprint feature there is determined a first parameter, such as being a relative spatial fingerprint position (i.e. relating to the finger). In a typical use-case, the fingerprint sensor (continuously) captures fingerprint image data e.g. during a verification process for verifying a finger of a user. Unfortunately, in some cases it may be so that some portions of the image data will be unavailable, for example in a situation where a host processor being arranged to receive the image data needs to handle something else, for example a phone call.

The typical prior-art approach is to delete all of the (partly) captured image data and request the user to once again place his finger at the fingerprint sensor such that a new fingerprint image may be acquired. By means of the invention, the first parameter (having a specific relation to "its" fingerprint feature) is used for relating the (first and second) fingerprint features to each other. The invention accordingly allows also for "partly complete" fingerprint images to be used for determining a fingerprint representation of a finger of the user.

Advantages with the invention include an improved robustness and efficiency of the fingerprint sensing system in cases where only separated portions of the fingerprint are available. This is according to the invention achieved by determining and correlating a relation between each of the separate image portions.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
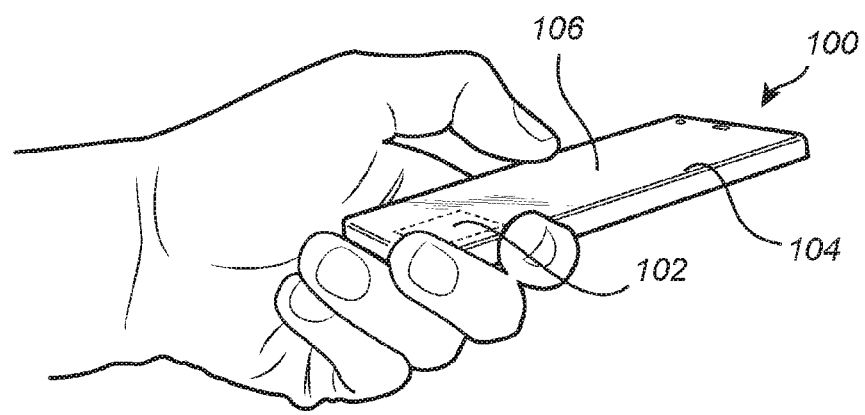
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
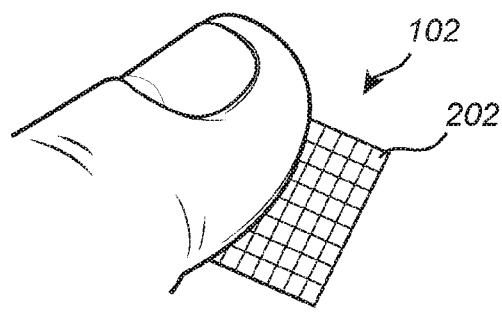
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
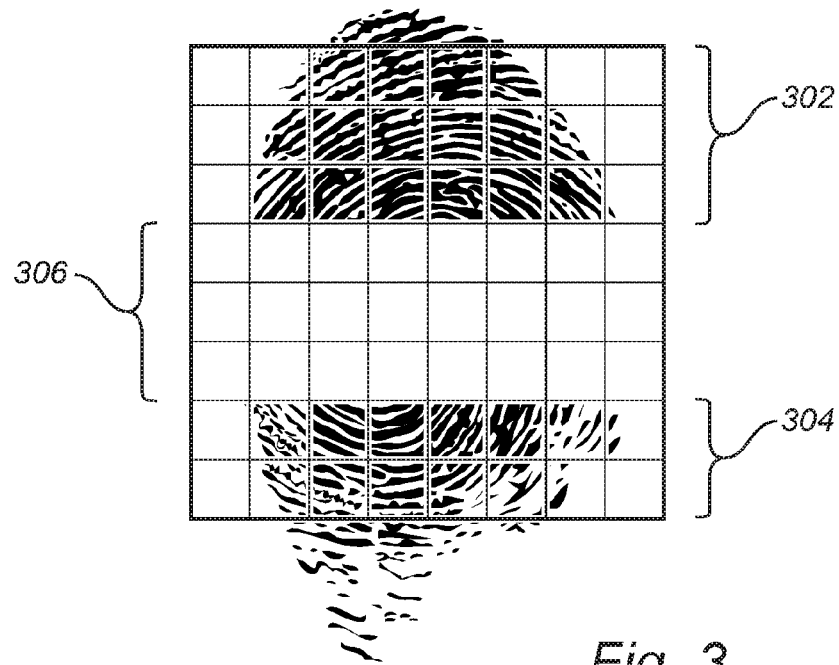
FIG. 3 illustrates a sequence of non-overlapping partial fingerprint images collected using the fingerprint sensor.
Figure 5:
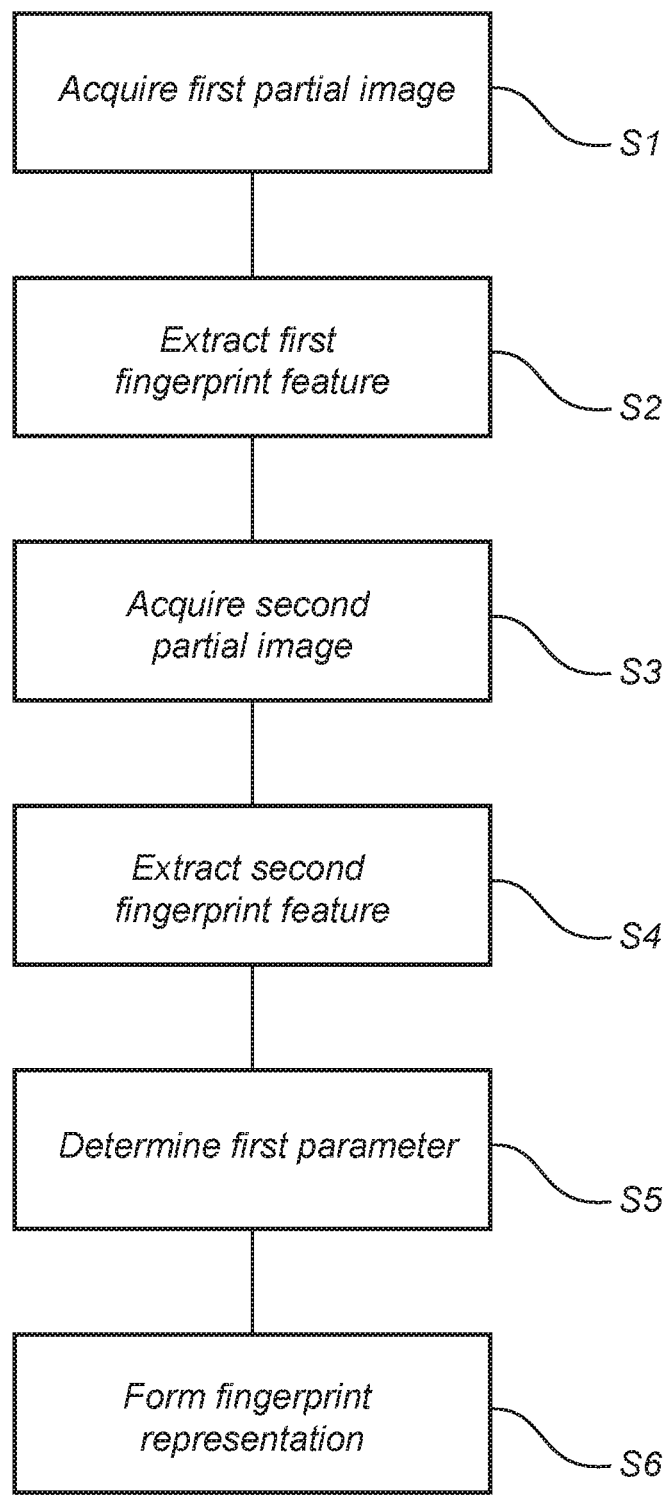
FIG. 5 is a flowchart disclosing the exemplary steps of the invention typically performed in conjunction with the fingerprint sensing system of FIG. 4.

FIG. 3 conceptually exemplifies the collection of a first 302 and a second 304 non-overlapping partial fingerprint image. In the illustrated embodiment, the first 302 and the second 304 partial fingerprint image is separated by a "blank" section 306, for example due to a situation where the fingerprint sensor 102 was interrupted from collecting image data. As mentioned above, in a prior art situation the complete image, including sections 302, 304 and 306 would be discarded and the user would be required to place or swipe his finger onto the fingerprint sensor 102 for capturing a new (complete) fingerprint image. However, in accordance to the invention the first 302 and the second 304 partial fingerprint image would still be used e.g. in an enrollment process and/or for verifying/authenticating the user, as will be further elaborated below in relation to FIG. 5.

Figure 4:
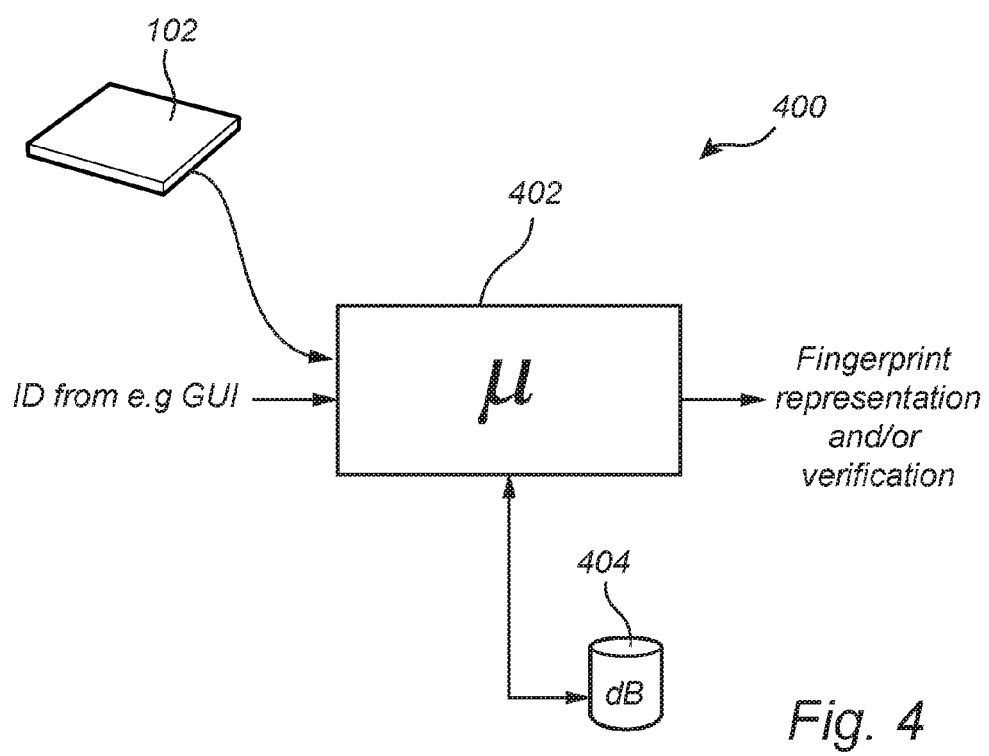
FIG. 4 conceptually illustrates a fingerprint sensing system according to a currently preferred embodiment of the invention.

In accordance with the invention, the fingerprint sensor 102 and the operation for forming the fingerprint representation is achieved using a conceptualized fingerprint sensor system 400 as is illustrated in FIG. 4. The fingerprint sensor system 400 in turn, typically, forms part of the electronic device/mobile as is exemplified in FIG. 1.

The fingerprint sensor system 400 comprises the fingerprint sensor 102 and a processing circuitry, such as a control unit 402 for controlling the fingerprint sensor 102. The fingerprint sensor system 400 further comprises a memory, such as a database 406. During operation of the fingerprint sensor system 400, with further reference to FIG. 5, the fingerprint sensor 102 is operated to acquire, S1, the first partial fingerprint image 302. The first partial fingerprint image 302 is then provided to and processed by the control unit 402 for extracting, S2, a first fingerprint feature, such as based on minutiae extraction. Subsequently, the second partial fingerprint image 304 is acquired, S3, by the fingerprint sensor 102 and a second fingerprint feature is extracted, S4. It should of course be understood that more than a single fingerprint feature could be extracted from each of the first and the second partial fingerprint image 302, 304. Also, more than the first 302 and the second 304 partial images could of course be acquired by the fingerprint sensor 102.

Once first fingerprint feature has been extracted for each of the first and the second partial fingerprint image 302, 304, a first parameter is determined, S5, for each of the respective first fingerprint features. The first parameter is, as discussed above, at least one of a representation of a relative spatial fingerprint position for the respective fingerprint feature and a representation of a relation of the fingerprint feature to the finger.

In a possible embodiment of the invention it could be possible to determine a time of when the first and the second partial fingerprint image 302, 304 were acquired, such as an acquisition time stamp for each of the first partial fingerprint image 302, 304. The acquisition time stamp could in turn be used for determining a duration between respective partial fingerprint images 302, 304. Hence, by combining the determined duration with a known or an estimated e.g. speed of swiping the finger over fingerprint sensor 102 (i.e. in case of a fingerprint swipe sensor), it will be possible to estimate a relative spatial fingerprint position for the respective fingerprint features extracted from the respective partial fingerprint images 302, 304 and thus an essentially absolute spatial relation between the fingerprint features of relating to the respective partial fingerprint images 302, 304.

Accordingly, even though the partial fingerprint images 302, 304 are non-overlapping and it would be impossible to stitch the partial fingerprint images 302, 304 with each other, the inherent information present in relation to each of the partial fingerprint images 302, 304 could still be used for forming, S6, a fingerprint representation.

In a possible embodiment of the invention, the fingerprint representation for a specific user could also be formed based on a known relation between a specific finger of the user and extracted features. That is, it could alternatively, or also, be possible to determine the first parameter for each of the first and the second fingerprint feature based on a representation of a relation of the fingerprint feature to the specific finger. In such a scenario it will be necessary to be certain, at least above a predetermined threshold, that a specific user in fact is handling and operating the fingerprint sensing system 400 comprising the fingerprint sensor 102.

In one exemplary embodiment, the identity for the user may be in some instances be pre-allocated to a specific device comprising the fingerprint sensing system 400. One example of such a scenario is when the fingerprint sensor system 400 is comprised with the mobile phone 100. In such a case, the mobile phone 100 is typically personal, i.e. only used by a single user. This type of implementation may of course be possible in relation to other type of devices, e.g. a laptop, table, etc., or when the fingerprint sensor system 400 is used with a single user desktop computer.

Accordingly, when for example using the disclosed method for enrolling a user, a secondary identification method such as by means of a PIN code could be used for achieving a certainty for the user to be above the predetermined threshold. In such an embodiment it could be possible to acquire partial fingerprint images "in the background", for example in a case where the fingerprint sensor 102 is arrange "behind" a home button of the mobile phone 100. As soon as the identity of the user has been determined, the fingerprint sensor 102 could be configured to acquire fingerprint images "as often as possible". Although the acquired partial fingerprint images are not necessarily completely spatially related to each other, the fingerprint features extracted are sure to relate to the same user. It could thus be possible to store, within the database 404, the extracted fingerprint features over time, where the first parameter for each of the stored fingerprint features would be knowledge of a relation to the specific user.

The fingerprint representation would thus be allowed to accumulate over time, e.g. starting from including only a few correlated fingerprint features. Once an adequate/predetermined number of fingerprint features have been stored in the database 404, it could be possible to use these (over time collected and stored) fingerprint features in also in a verification process. Hence, the user has in such a case been "background enrolled" with the fingerprint sensing system 400 without having to go through the sometimes time consuming enrollment process. Thus, after some time the fingerprint sensing system 400 may inform the user of the possibility of using the fingerprint sensing system 400 also for verification, purchases, etc.

Such a verification process, typically also performed by the control unit 402, would again compare fingerprint features extracted during the verification process with the enrolled fingerprint features stored in the database 404. The control unit 402 would as a result output a signal indicative of a result of the comparison. In case of a positive comparison, the signal may be used for unlocking the mobile phone 100, for authenticating the user with the mail account, and/or banking app/client. In case of a negative comparison, the user may once again be requested to go through the process of fingerprint verification/authentication.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A method of forming a fingerprint representation of a fingerprint pattern of a finger captured using a fingerprint sensor, the method comprising the steps of:
   acquiring a first partial image of a corresponding first portion of a fingerprint pattern using the fingerprint sensor;
   extracting a first fingerprint feature from the first partial image;
   acquiring a second partial image of a corresponding second portion of the fingerprint pattern using the fingerprint sensor, the second partial image being non-overlapping with the first partial image;
   extracting a second fingerprint feature from the second partial image;
   determining a first parameter for each of the first and the second fingerprint feature, the first parameter being at least one of a representation of a relative spatial fingerprint position for the respective fingerprint feature and a representation of a relation of the fingerprint feature to the finger, wherein determining the first parameter for each of the first and the second fingerprint feature comprises correlating at least one of the first and the second fingerprint features with a fingerprint feature of a previously acquired fingerprint representation; and
   forming the fingerprint representation by correlating the first parameter for the first fingerprint feature with the first parameter for the second fingerprint feature.

2. The method according to claim 1, wherein the second partial image is acquired at a subsequent instance in time in comparison to the acquisition of the first partial image, and the step of determining the first parameter for each of the first and the second fingerprint feature comprises at least one of:
   determining a duration between the acquisition of the first and the second partial image, and
   determining a speed of the finger being swiped over the fingerprint sensor.

3. The method according to claim 2, further comprises the step of determining a spatial relation between the first and the second fingerprint feature based on the first parameter.

4. The method according to claim 1, wherein the first parameter for the first fingerprint feature and the first parameter for the second fingerprint feature are related to the same finger of a user.

5. The method according to claim 1, wherein the step of forming the fingerprint representation comprises appending the previously acquired fingerprint representation with at the least one of the first and the second fingerprint feature.

6. The method according to claim 1, wherein the step of correlating at least one of the first and the second fingerprint features with a fingerprint features of a previously acquired fingerprint representation is part of a process of enrolling the finger.

7. The method according to claim 1, wherein the extraction of the first fingerprint feature from the first partial image is performed independent on the extraction of the second fingerprint feature from the second partial image.

8. The method according to claim 1, wherein the fingerprint sensor is a line sensor.

9. The method according to claim 2, further comprising the step of determining the position of the finger at an instance in time of acquiring the first and the second partial image.

10. The method according to claim 9, wherein the fingerprint sensor is arranged adjacently to a touch display, and the step of determining the position of the finger is based on data received from the touch display.

11. The method according to claim 1, further comprising the steps of
   acquiring a fingerprint template representative of an enrolled fingerprint of a finger, and
   authenticating the formed fingerprint representation.

12. A fingerprint sensing system, comprising:
   a fingerprint sensor;
   a memory; and
   processing circuitry for forming a fingerprint representation of a fingerprint pattern of a finger captured using the fingerprint sensor, the processing circuitry connected to the fingerprint sensor and further configured for:
      acquiring a first partial image of a corresponding first portion of a fingerprint pattern using the fingerprint sensor;
      extracting a first fingerprint feature from the first partial image;
      acquiring a second partial image of a corresponding second portion of the fingerprint pattern using the fingerprint sensor, the second partial image being non-overlapping with the first partial image;
      extracting a second fingerprint feature from the second partial image;
      determining a first parameter for each of the first and the second fingerprint feature, the first parameter being at least one of a representation of a relative spatial fingerprint position for the respective fingerprint feature and a representation of a relation of the fingerprint feature to the finger, wherein determining the first parameter for each of the first and the second fingerprint feature comprises correlating at least one of the first and the second fingerprint features with a fingerprint feature of a previously acquired fingerprint representation; and forming the fingerprint representation by correlating the first parameter for the first fingerprint feature with the first parameter for the second fingerprint feature.

13. The fingerprint sensing system according to claim 12, wherein said fingerprint sensor is a capacitive fingerprint sensor.

14. The fingerprint sensing system according to claim 12, wherein the fingerprint sensor is a line sensor.

15. The fingerprint sensing system according to claim 12, wherein the processing circuitry is further configured for:
   acquiring a fingerprint template representative of an enrolled fingerprint of a finger, and
   authenticating the formed fingerprint representation.

16. An electronic device, comprising:
   the fingerprint sensing system according to claim 12; and
   at least one processor for:
      providing an authentication request for said finger to the fingerprint sensing system;
      receiving an authentication signal from the fingerprint sensing system; and
      performing at least one action only if said authentication signal indicates authentication success.

17. The electronic device according to claim 16, wherein the electronic device is a mobile phone.

18. A computer program product comprising a non-transitory computer readable medium having stored thereon computer program means for controlling a portable electronic device, the portable electronic device comprising a fingerprint sensing system including a fingerprint sensor and processing circuitry, the fingerprint sensing system adapted for forming a fingerprint representation of a fingerprint pattern of a finger captured when swiped over the fingerprint sensor, wherein the computer program product comprises:
   code for acquiring a first partial image of a corresponding first portion of a fingerprint pattern using the fingerprint sensor;
   code for extracting a first fingerprint feature from the first partial image;
   code for acquiring a second partial image of a corresponding second portion of the fingerprint pattern using the fingerprint sensor, the second partial image being non-overlapping with the first partial image;
   code for extracting a second fingerprint feature from the second partial image;
   code for determining a first parameter for each of the first and the second fingerprint feature, the first parameter being at least one of a representation of a relative spatial fingerprint position for the respective fingerprint feature and a representation of a relation of the fingerprint feature to the finger, wherein determining the first parameter for each of the first and the second fingerprint feature comprises correlating at least one of the first and the second fingerprint features with a fingerprint feature of a previously acquired fingerprint representation; and
   code for forming the fingerprint representation by correlating the first parameter for the first fingerprint feature with the first parameter for the second fingerprint feature.

* * * * *